(12) United States Patent  (10) Patent No.: US 6,178,242 B1
Tsuria                     (45) Date of Patent: *Jan. 23, 2001

(54) DIGITAL RECORDING PROTECTION SYSTEM

(75) Inventor: Yossef Tsuria, Shoham (IL)

(73) Assignee: NDS Limited (GB)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/014,791

(22) Filed: Jan. 28, 1998

(30) Foreign Application Priority Data

Feb. 7, 1997 (IL) ............................................. 120174
Dec. 3, 1997 (GB) ............................................ 97255574

(51) Int. Cl.$^7$ ................................................... H04N 7/167
(52) U.S. Cl. ..................................... 380/201; 380/239
(58) Field of Search ............................ 380/4, 10, 21, 380/42, 49, 43, 50

(56) References Cited

U.S. PATENT DOCUMENTS

| 4,989,245 | 1/1991 | Bennett | 380/23 |
| 5,144,664 | 9/1992 | Borth | 375/96 |
| 5,282,249 | 1/1994 | Cohen et al. | 380/23 |
| 5,481,609 | 1/1996 | Cohen et al. | 380/16 |
| 5,574,787 | 11/1996 | Ryan | 380/5 |
| 5,852,290 | * 12/1998 | Chaney | 235/492 |
| 5,937,067 | * 8/1999 | Thatcher et al. | 380/21 |

FOREIGN PATENT DOCUMENTS

| 0 461 029 A1 | 12/1991 | (EP) | H04N/7/167 |
| 636039 | 12/1991 | (AU) | H04N/7/167 |
| 0471373 | 2/1992 | (EP) | H04N/7/167 |
| 0506435 | 9/1992 | (EP) | H04N/7/167 |
| 0714204 | 11/1994 | (EP) | H04N/5/913 |
| 0750423 A3 | 12/1996 | (EP) | H04N/7/167 |
| 2732537 | 10/1996 | (FR) | H04N/7/16 |

OTHER PUBLICATIONS

"Functional Model of a Conditional Access System," EBU Technical Review, No. 266, Dec. 21, 1995, pp. 64–77.
L. C. Guillou et al., "Encipherement and Conditional Access," SMPTE Journal, vol. 103, No. 6, Jun. 1, 1994, pp. 398–406.
The MPEG–2 Standard, ISO/IEC 13818–6, Jul. 12, 1996.
Okamoto et al., "A Consumer Digital VCR for Digital Broadcasting", Pubished in *IEEE Transactions on Consumer Electronics,* vol. 41, No. 3, Aug. 1995, pp. 643–649.
"Examining the Implications of the Transcontrol Function", which were distributed at a seminar held by IIR, Ltd., in London, England, Jan. 29, 1997.

* cited by examiner

Primary Examiner—Tod R. Swann
Assistant Examiner—Trevor Quick Coddington
(74) Attorney, Agent, or Firm—Limbach & Limbach LLP

(57) ABSTRACT

A system for producing an output scrambled digital data stream from an input scrambled digital data stream. The input scrambled digital data stream includes a plurality of control messages (ECMs), each ECM including coded information for generating a control word (CW) associated with the ECM and being encoded using an ECM key. The input scrambled digital data stream also includes a plurality of segments of scrambled digital data, each segment of scrambled digital data being associated with one of the plurality of ECMs and being scrambled using the CW associated with the ECM. A method for producing the output scrambled digital data stream includes replacing each of the plurality of ECMs with a corresponding transformed ECM (TECM), each corresponding TECM comprising coded information for generating the CW associated with the corresponding ECM and being encoded using a TECM key, thus producing the output scrambled digital data stream, wherein the ECM key is replaced with a new ECM key at an ECM key change time, and the TECM key is not replaced at the ECM key change time.

29 Claims, 4 Drawing Sheets

US 6,178,242 B1

DIGITAL RECORDING PROTECTION SYSTEM

FIELD OF THE INVENTION

The present invention relates to the production and recording of digital data streams, particularly scrambled digital data streams such as scrambled digital television data streams.

BACKGROUND OF THE INVENTION

Systems for scrambling a television data stream are well-known in the art. One such system is described in the following U.S. Pat. No. 5,282,249 to Cohen et al.; U.S. Pat. No. 5,481,609 to Cohen et al. Scrambled television data streams described in the Cohen et al. patents comprise both scrambled data representing television signals and coded control messages, also known as ECMs. The ECMs of Cohen et al. comprise, in a coded form, data necessary for generating a control word (CW) which may be used to descramble the scrambled data representing television signals.

While the two patents to Cohen et al. describe an analog system, that is, a system in which analog television data streams are broadcast to television sets, it is appreciated that similar ECM methods may also be used for digital television data streams. Generally, the scrambling techniques used for scrambling analog television signals such as, for example, the well-known "cut-and-rotate" technique, are chosen for their applicability to analog signals. In scrambling of digital television signals other scrambling techniques, well-known in the art, are used, the techniques being more appropriate to digital signals such as, for example, applying the well-known DES algorithm to the digital television signals.

Methods of transmitting a scrambled digital signal, including ECMs, are described in the MPEG-2 standard, ISO/TEC 13818-6, Jul. 12, 1996 and subsequent editions.

Recording of analog television signals such as, for example, recording using a VCR, is well-known in the art and VCR equipment is widely commercially available from a variety of manufacturers. Recording of digital television signals is also known. A consumer digital VCR is described, for example, in the article "A Consumer Digital VCR for Digital Broadcasting" by Okamoto et al., published in *IEEE Transactions on Consumer Electronics*, Vol. 41, No. 3, August 1995, pp. 643–649.

U.S. Pat. No. 5,574,787 to Ryan describes an apparatus and method for copy protection for video platforms in which a specially adapted video recorder, playback device, or set top decoder is used to protect copyright material.

European patent application EP 0 714 204 A2, assigned to LG Electronics, Inc., describes a method for copy protection in digital video systems.

The disclosures of all references mentioned above and throughout the present specification are hereby incorporated herein by reference.

SUMMARY OF THE INVENTION

The present invention seeks to provide an improved system for producing and recording digital data streams, and particularly for protecting recorded digital data streams including digital television data.

The prior art digital recording systems referred to above do not fully address the problem of recording a scrambled digital data stream. The term "digital data stream", as used throughout the present specification and claims, refers in a broad sense to any stream of digital data transmitted continuously at least during a particular period of time, and particularly includes broadcast digital data such as broadcast digital television signals. The term "scrambling" in all of its forms, as used throughout the present specification and claims, refers to any method of scrambling, encoding, or encrypting data, many such methods being well-known in the art.

A digital VCR such as that described by Okamoto et al. records and reproduces a digital bit stream; that is, the digital VCR of Okamoto et al. records and produces whatever bits are presented thereto. Thus, the digital VCR of Okamoto et al. could record and reproduce a scrambled digital data stream. In the system of Okamoto et al., however, problems could arise in descrambling the recorded data stream such as, for example, for playing on a television.

As is well known in the art, security functions in scrambled television systems are typically controlled by a removable security element such as a removable smart card. Furthermore, it is well known in the art that, in actual practice, operators of scrambled television systems periodically replace the removable security elements found in consumer home systems in order to change the security and scrambling behavior of the system.

After replacement of the removable security element or, typically, after a limited transition period following replacement of the removable security element, broadcasts scrambled with methods applicable to the previous removable security element can not be descrambled using the present removable security element. Typically, therefore, if a recording were made on a system such as that described by Okamoto et al. of a broadcast from a digital system using techniques similar to those described by Cohen et al. and in the MPEG-2 standard, both referred to above, the recording would become unusable as soon as a change of removable security elements was carried out by the scrambled television system operator. The present invention seeks to provide apparatus and methods for recording digital data streams which, in addition to having other features, overcome the problem of unusability of recordings after a change of removable security elements.

There is thus provided in accordance with a preferred embodiment of the present invention a method for producing an output scrambled digital data stream from an input scrambled digital data stream, the input scrambled digital data stream including a plurality of control messages (ECMs), each ECM including coded information for generating a control word (CW) associated with the ECM and being encoded using an ECM key, the input scrambled digital data stream also including a plurality of segments of scrambled digital data, each segment of scrambled digital data being associated with one of the plurality of ECMs and being scrambled using the CW associated with the ECM, the method including replacing each of the plurality of ECMs with a corresponding transformed ECM (TECM), each corresponding TECM including coded information for generating the CW associated with the corresponding ECM and being encoded using a TECM key, thus producing the output scrambled digital data stream, wherein the ECM key is replaced with a new ECM key at an ECM key change time, and the TECM key is not replaced at the ECM key change time.

Further in accordance with a preferred embodiment of the present invention the step of replacing includes performing the following steps iteratively for each one of the plurality of ECMs: receiving the one ECM and the segment of scrambled digital data associated therewith, generating the associated CW from the one ECM using the ECM key, generating a transformed ECM (TECM) including coded information for generating the associated CW and being encoded using a TECM key, outputting the TECM, and outputting the segment of scrambled digital data associated with the ECM.

There is also provided in accordance with another preferred embodiment of the present invention a method for recording, on a recording medium, a broadcast scrambled digital data stream to produce a scrambled digital recording, the broadcast scrambled digital data stream including a plurality of control messages (ECMs), each ECM including coded information for generating a control word (CW) associated with the ECM and being encoded using an ECM key, the broadcast scrambled digital data stream also including a plurality of segments of scrambled digital data, each segment of scrambled digital data being associated with one of the plurality of ECMs and being scrambled using the CW associated with the ECM, the method including receiving the broadcast scrambled digital data stream, and recording on the recording medium a scrambled digital data stream including a plurality of transformed ECMs (TECMs) and the plurality of segments of digital data, wherein each of the plurality of ECMs is replaced with a corresponding TECM, each corresponding TECM including coded information for generating the CW associated with the corresponding ECM and being encoded using a TECM key.

Further in accordance with a preferred embodiment of the present invention the recording step includes performing the following steps iteratively for each one of the plurality of ECMs in the broadcast scrambled digital data stream: generating the associated CW from the one ECM using the ECM key, generating a TECM including coded information for generating the associated CW and being encoded using a TECM key, recording the TECM on the recording medium, and recording the segment of scrambled digital data associated with the one ECM on the recording medium.

Still further in accordance with a preferred embodiment of the present invention the recording medium includes a digital tape.

Further in accordance with a preferred embodiment of the present invention the recording medium includes a computer-accessible storage medium associated with a computer.

Additionally in accordance with a preferred embodiment of the present invention the broadcast scrambled digital data stream includes a television scrambled digital data stream.

Moreover in accordance with a preferred embodiment of the present invention each of the plurality of ECMs is encoded using a hashing method.

There is also provided in accordance with another preferred embodiment of the present invention apparatus for recording, on a recording medium, a broadcast scrambled digital data stream to produce a recorded scrambled digital data stream, the broadcast scrambled digital data stream including a plurality of scrambling control messages (ECMs), each ECM including coded information for generating a control word (CW) associated with the ECM and being encoded using an ECM key, and a plurality of segments of scrambled digital data, each segment of scrambled digital data being associated with one of the plurality of ECMs and being scrambled using the CW associated with the ECM, the apparatus including receiving apparatus for receiving the broadcast scrambled digital data stream, and recording apparatus for recording on the recording medium a scrambled digital data stream including a plurality of transformed ECMs (TECMs) and the plurality of segments of digital data, wherein each of the plurality of ECMs is replaced with a corresponding TECM, each corresponding TECM including coded information for generating the CW associated with the corresponding ECM and being encoded using a TECM key.

There is also provided in accordance with another preferred embodiment of the present invention apparatus for producing an output scrambled digital data stream from an input scrambled digital data stream, the input scrambled digital data stream including a plurality of scrambling control messages (ECMs), each ECM including coded information for generating a control word (CW) associated with the ECM and being encoded using an ECM key, and a plurality of segments of scrambled digital data, each segment of scrambled digital data being associated with one of the plurality of ECMs and being scrambled using the CW associated with the ECM, the apparatus including ECM replacement apparatus for replacing each of the plurality of ECMs with a corresponding transformed ECM (TECM), each corresponding TECM including coded information for generating the CW associated with the corresponding ECM and being encoded using a TECM key, wherein the ECM key is replaced with a new ECM key at an ECM key change time, and the TECM key is not replaced at the ECM key change time.

Further in accordance with a preferred embodiment of the present invention the recording apparatus includes a CW extractor for generating the associated CW from each of the plurality of ECMs using the ECM key, a TECM generator for receiving the associated CW from the CW extractor and for generating a TECM including coded information for generating the associated CW and being encoded using a TECM key, and medium recording apparatus for receiving the TECM from the TECM generator and the segment of scrambled digital data from the receiving apparatus and for recording the TECM and the segment of scrambled digital data associated with the one of the plurality of ECMs on the recording medium.

Still further in accordance with a preferred embodiment of the present invention the ECM replacement apparatus includes a CW extractor for generating the associated CW from each of the plurality of ECMs using the ECM key, and a TECM generator for receiving the associated CW from the CW extractor and for generating a TECM including coded information for generating the associated CW and encoded using a TECM key.

Additionally in accordance with a preferred embodiment of the present invention the apparatus includes a removable security device, wherein the removable security device includes the CW extractor.

Moreover in accordance with a preferred embodiment of the present invention the removable security device also includes the TECM generator.

Further in accordance with a preferred embodiment of the present invention the removable security device includes a smart card.

There is also provided in accordance with another preferred embodiment of the present invention apparatus for transforming a scrambling control message (ECM) including coded information for generating a control word (CW) associated with the ECM and being encoded using an ECM key into a transformed scrambling control message (TECM), the apparatus including ECM input apparatus for receiving the ECM, a CW extractor for generating the associated CW from the ECM using the ECM key, a TECM generator for generating a transformed ECM (TECM) including coded information for generating the associated CW and being encoded using a TECM key, and ECM output apparatus for outputting the TECM, wherein the ECM key is replaced with a new ECM key at an ECM key change time, and the TECM key is not replaced at the ECM change time.

There is also provided in accordance with another preferred embodiment of the present invention apparatus for producing an output scrambled digital data stream from an input scrambled digital data stream, the input scrambled digital data stream including a plurality of control messages (ECMs), each ECM including coded information for generating a control word (CW) associated with the ECM and being encoded using an ECM key, the input scrambled digital data stream also including a plurality of segments of scrambled digital data, each segment of scrambled digital data being associated with one of the plurality of ECMs and being scrambled using the CW associated with the ECM, the apparatus including scrambled digital data stream input apparatus for receiving an ECM and a segment of scrambled digital data associated therewith, ECM replacement apparatus for replacing the ECM with a transformed ECM (TECM), and scrambled digital data stream output apparatus for outputting the output scrambled digital data stream including the TECM and the segment of scrambled digital data, wherein the ECM key is replaced with a new ECM key at an ECM key change time, and the TECM key is not replaced at the ECM key change time.

Further in accordance with a preferred embodiment of the present invention the apparatus includes ECM interface apparatus for outputting the ECM and receiving the TECM.

Still further in accordance with a preferred embodiment of the present invention the ECM interface is adapted to receive a removable security element.

Additionally in accordance with a preferred embodiment of the present invention the removable security element includes a smart card.

There is also provided in accordance with another preferred embodiment of the present invention a method for transforming a scrambling control message (ECM) including coded information for generating a control word (CW) associated with the ECM and being encoded using an ECM key into a transformed scrambling control message (TECM), the method including receiving the ECM, generating, the associated CW from the ECM using the ECM key, generating a transformed ECM (TECM) including coded information for generating the associated CW and being encoded using a TECM key, and outputting the TECM, wherein the ECM key is replaced with a new ECM key at an ECM change time, and the TECM key is not replaced at the ECM change time.

There is also provided in accordance with another preferred embodiment of the present invention a method for producing an output scrambled digital data stream from an input scrambled digital data stream, the input scrambled digital data stream including a plurality of control messages (ECMs), each ECM including coded information for generating a control word (CW) associated with the ECM and being encoded using an ECM key, the input scrambled digital data stream also including a plurality of segments of scrambled digital data, each segment of scrambled digital data being associated with one of the plurality of ECMs and being, scrambled using the CW associated with the ECM, the method including receiving an ECM and a segment of scrambled digital data associated therewith, replacing the ECM with a transformed ECM (TECM), and outputting the output scrambled digital data stream including the TECM and the segment of scrambled digital data, wherein the ECM key is replaced with a new ECM key at an ECM key chance time, and the TECM key is not replaced at the ECM key change time.

Further in accordance with a preferred embodiment of the present invention the method also includes outputting the ECM and receiving the TECM.

Still further in accordance with a preferred embodiment of the present invention the step of outputting the ECM and receiving the TECM includes outputting the ECM to a removable security element and receiving the TECM from the removable security element.

Additionally in accordance with a preferred embodiment of the present invention removable security element includes a smart card.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
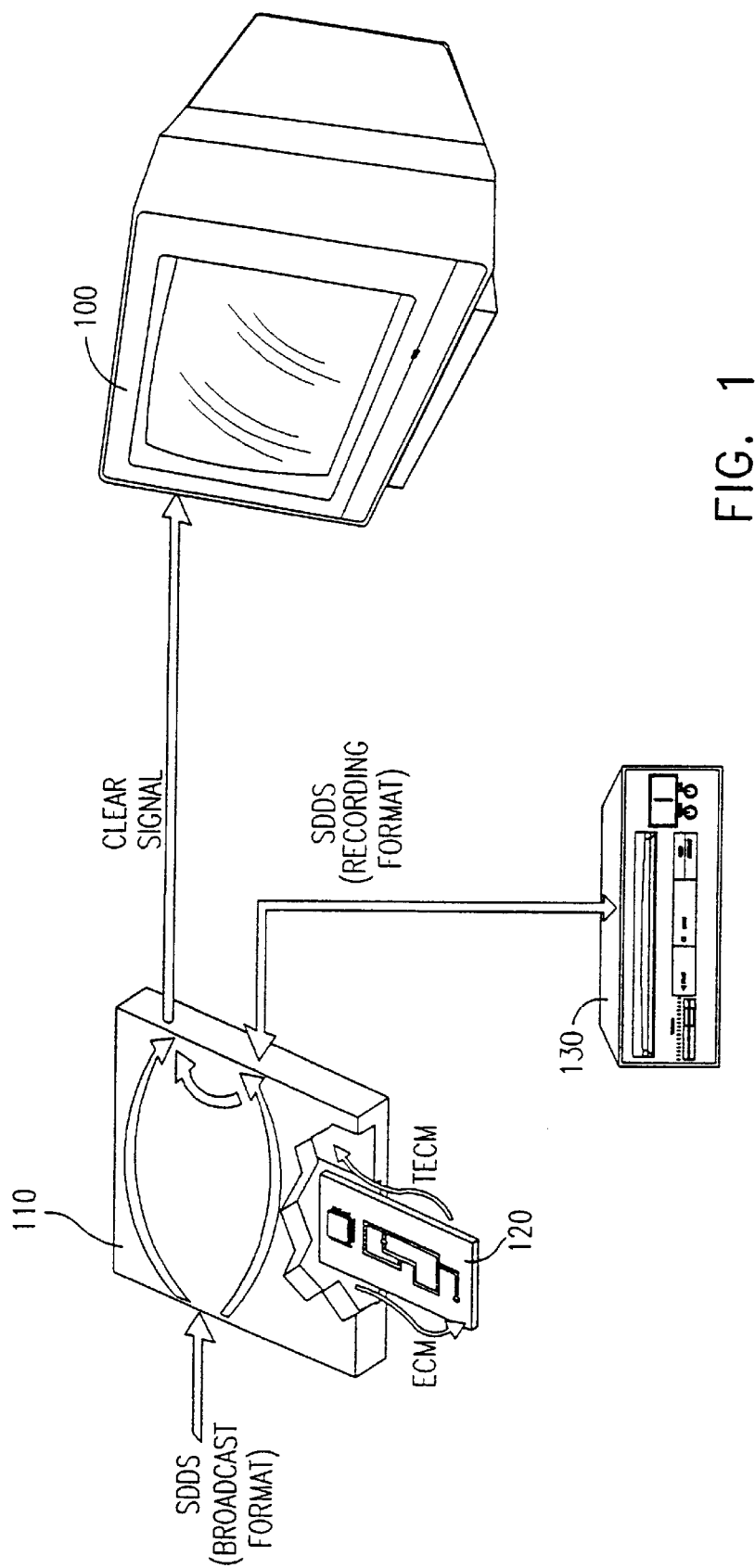
FIG. 1 is a simplified partly pictorial, partly block-diagram illustration of a scrambled digital data stream recording and playback system, constructed and operative in accordance with a preferred embodiment of the present invention.

Reference is now made to FIG. 1 which is a simplified partly pictorial, partly block-diagram illustration of a scrambled digital data stream (SDDS) recording and playback system, constructed and operative in accordance with a preferred embodiment of the present invention. The system of FIG. 1 comprises a television set 100. The television set 100 may comprise any appropriate commercially available television set. As described below, in accordance with the other elements of the system FIG. 1 described below, the television set 100 may comprise either an appropriate analog television set or an appropriate digital television set.

The system of FIG. 1 also comprises an integrated receiver-decoder (IRD) 110. The IRD 110 may be based on any appropriate commercially-available IRD operative to receive and decode a scrambled broadcast digital data stream and preferably additionally contains other hardware and/or software components, as described below.

The system of FIG. 1 also comprises a removable security element, such as a smart card 120, in removable operative attachment with the IRD 110. The smart card 120 is typically suitably programmed, as is well-known in the art, to provide control words (CWs) for descrambling of a scrambled broadcast digital data stream by the IRD 110. Methods for programming and utilizing smart cards such as the smart card 120 to produce CWs are well-known in the art and are described, for example, in U.S. Pat. No. 5,282,249 to Cohen et al. and U.S. Pat. No. 5,481,609 to Cohen et al., referred to above, with suitable modifications, as are well-known in the art and described above, particularly in the MPEG-2 standard, for operating on digital rather than on analog data.

The system of FIG. 1 also preferably comprises a digital VCR 130, which may comprise any suitable digital VCR such as, for example, the digital VCR described in the article "A Consumer Digital VCR for Digital Broadcasting" by Okamoto et al., referred to above. It is appreciated that any other appropriate digital recording apparatus may be used in place of the digital VCR 130, the digital VCR 130 being shown in FIG. 1 by way of example only. For example, and without limiting the generality of the foregoing, an appropriate computer system may be used in place of the digital VCR 130, the computer system being typically operative to record onto a computer-accessible storage medium associated therewith.

The IRD 110 is preferably operatively attached to the television set 100 and the digital VCR 130. It is appreciated that the IRD 110 may include digital-to-analog conversion apparatus (not shown), as is well known in the art, and may provide analog signals to the television set 100, in which case the television set 100 may comprise an analog television set. Alternatively, the IRD 110 may provide digital signals to the television set 100, in which case the television set 100 may comprise a digital television set. In any case, it is appreciated that digital signals are preferably used between the IRD 110 and the digital VCR 130.

The operation of the system of FIG. 1 is now briefly described. The IRD 110 receives a scrambled digital data stream, also known herein as a SDDS, from a broadcast source. The broadcast source may comprise any appropriate broadcast source such as, for example, a digital cable broadcast, a local digital television broadcast, or a digital satellite television broadcast, all of which are well-known in the art. Typically, the SDDS may comprise an MPEG-2 data stream. as described in the MPEG-2 standard, referred to above. More generally, it is appreciated that the present invention is not limited to television broadcasts, but is applicable to all types of digital broadcast, including data broadcasts, so that the broadcast source may comprise any appropriate source broadcasting a SDDS in appropriate format.

The IRD 110, in cooperation with the smart card 120, is preferably operative to descramble the SDDS. Typically, as is well known in the art and as is described above, the SDDS comprises a plurality of ECMs. Each ECM is associated with, and is typically followed by, a scrambled digital data segment (SDSEG). Each ECM is typically encoded and comprises therein information, such as a seed, which can be used, typically by the smart card 120, to generate a CW, the CW in turn being utilizable to unscramble the associated SDSEG.

It is appreciated that many different methods may be used to imbed the seed in the ECM and that corresponding methods can be used to extract the seed therefrom and to generate the CW. For example and without limiting the generality of the foregoing, the seed may be the input to a one-way function such as a hash function, and the CW may be the result of performing the hash function on the seed. The CW, in turn, can be used, typically by the IRD 110, as a key for descrambling the scrambled data segment associated with the ECM.

Figure 2:
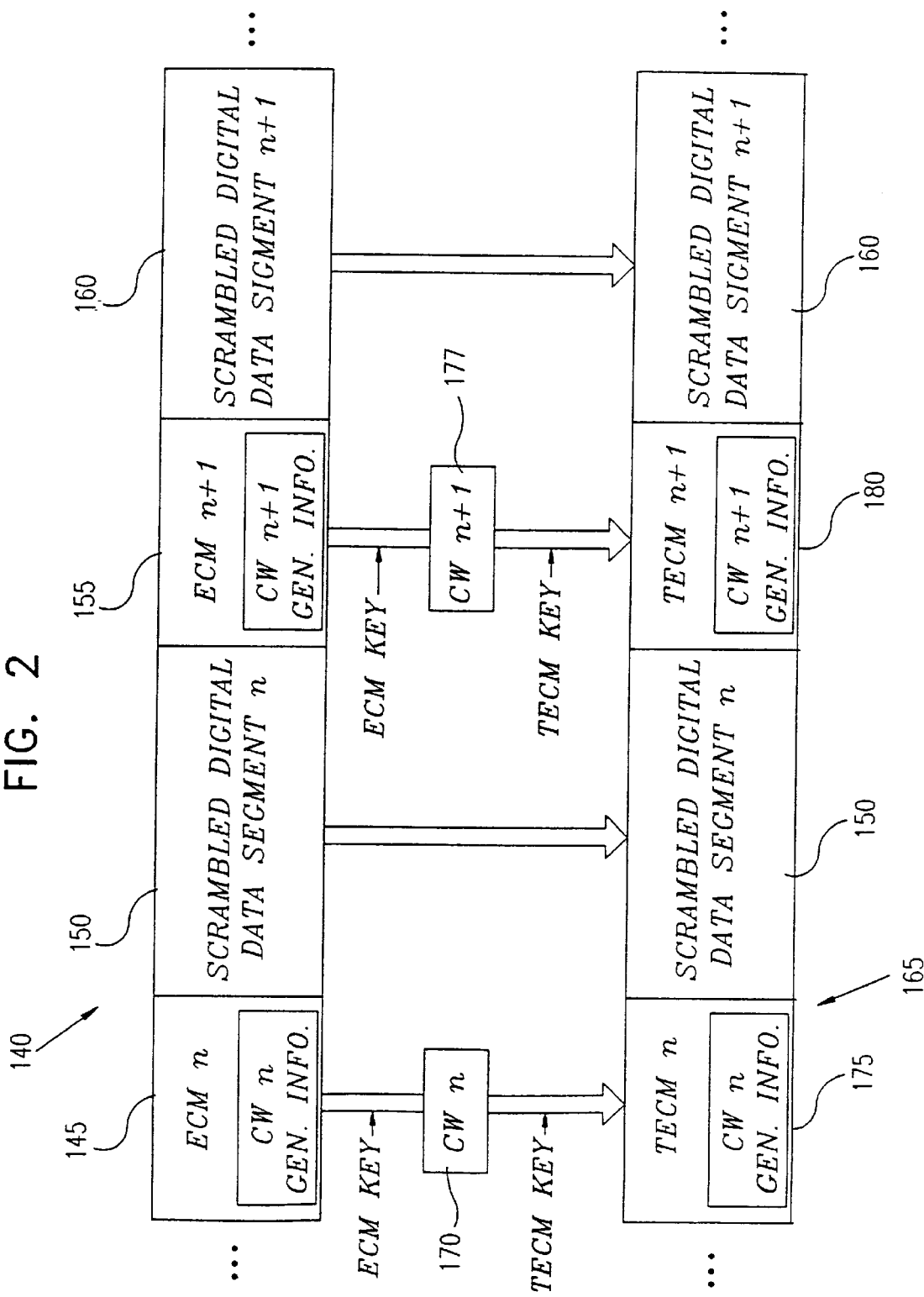
FIG. 2 is a simplified block diagram illustrating the production of a recording scrambled digital data stream from a broadcast scrambled digital data stream by a portion of the apparatus of FIG. 1.

Reference is now additionally made to FIG. 2, which is a simplified block diagram illustrating the production of a recording scrambled digital data stream from a broadcast scrambled digital data stream by the IRD 110 of FIG. 1. The block diagram of FIG. 2 comprises a simplified illustration of a broadcast SDDS 140, which, as described above, typically comprises a plurality of ECMs and a plurality of associated SDSEGs, such as: an nth ECM 145; an nth SDSEG 150 associated with the nth ECM 145; and n+1th ECM 155; and an n+1th SDSEG 160 associated with the n+1th ECM 155. It is appreciated that the block diagram of FIG. 2 is schematic only, and that the plurality of ECMs and the plurality of associated SDSEGs need not be physically contiguous. One particular example of the actual layout of ECMs and the associated SDSEGs in an SDDS is given in the MPEG-2 standard, referred to above.

The IRD 110 of FIG. 1, in cooperation with the smart card 120, is preferably operative to process the broadcast SDDS 140, in order to produce a recording SDDS 165, as follows. Each ECM, such as the nth ECM 145, is processed as described above, typically using an ECM key, which may comprise a one-way function as described above, the ECM key being known to the smart card 120, in order to obtain the associated CW such as an nth CW 170. The nth CW 170 is then processed using another key, referred to throughout the present specification and claims as a TECM key, in order to produce an nth TECM 175 which may later be used, with the TECM key, to generate the nth CW 170.

Preferably each TECM, such as, for example, the nth TECM 175, is also signed with an appropriate digital signature, as is well known in the art. Preferably, each TECM key is associated with a unique digital signature. Preferably, upon subsequent playback and descrambling of the recording SDDS 165 the digital signature is checked, and only a valid digital signature indicating that the recording SDDS 165 was produced with the apparatus of FIG. 1, typically particularly with the smart card 120 of FIG. 1, will be descrambled by the apparatus of FIG. 1. The use of such a digital signature is considered preferable in order to discourage unauthorized duplication and subsequent playback of the recording SDDS 165 using apparatus other than the apparatus of FIG. 1, particularly using a different smart card at some other location in place of the smart card 120.

The TECM key may be of similar type to the ECM key such as, for example, a one-way function. The TECM key, however, is preferably permanently associated with the system of FIG. 1; particularly, the TECM key does not change even when the smart card 120 is replaced by the system operator, as described above. Thus, it will be appreciated that any SDDS associated with the TECM key may still be descrambled using the apparatus of FIG. 1 even after such a replacement of the smart card 120. It is appreciated that the TECM key may be produced in a wide variety of ways, such as, for example, the TECM key may be associated with and, typically, stored in the IRD 110; the smart card 120; a combination of the IRD 110 and the smart card 120, such as partly in the IRD 110 and partly in the smart card 120; or another portion of the system of FIG. 1 (not shown). It is also appreciated that the TECM key may be personal to a particular user of the apparatus of FIG. 1, with more than one TECM key being associated with the apparatus of FIG. 1 and the appropriate TECM key being produced upon identification of a user of the apparatus of FIG. 1 by any method well known in the art, such as by provision of a personal identification number (PIN).

It is appreciated that, in a case where the TECM key is at least partially associated with or stored in a removable security element such as the smart card 120, a method is preferably provided for keeping the TECM key unchanged even when the smart card 120 is replaced, as described above. Methods for providing an unchanging item of information are well known in prior art scrambled television systems using removable security elements. For example, and without limiting the generality of the foregoing, when the smart card 120 is replaced an operation may be carried out whereby an unchanging item of information stored only in the smart card 120 is temporarily stored in the IRD 110 and is then written to the replacement smart card (not shown) and erased from the IRD 110. Such prior art methods, for example, may be used to cause a TECM key to be unchanging even when the smart card 120 is replaced.

After the nth TECM 175 is generated and placed in the recording SDDS 165, the nth SDSEG 150 may be placed in the recording SDDS 165. It is appreciated that the present invention provides an apparatus and method for producing an appropriate recording SDDS 165 without requiring descrambling of any SDSEG such as the nth SDSEG 150 during the production of the recording SDDS 165 and without requiring a scrambling operation to produce an SDSEG to occur in the system of FIG. 1 at any time.

It is appreciated that the method described above with respect to the nth ECM 145 and the nth SDSEG 150 may be repeatedly or iteratively applied to other ECMs and the associated SDSEGs such as, for example, the n+1th ECM 155, associated with an n+1th CW 177, to produce an n+1th TECM 180 and the n+1th SDSEG 160 in the recording SDDS 165.

It is also appreciated that, during playback of a recording SDDS from the digital VCR 130 through the IRD 110 and associated smart card 120 to the television 100, the IRD 110 and the associated smart card 120 may perform operations similar to those performed on a broadcast SDDS, but using the TECM key rather than the ECM key.

Figure 3:
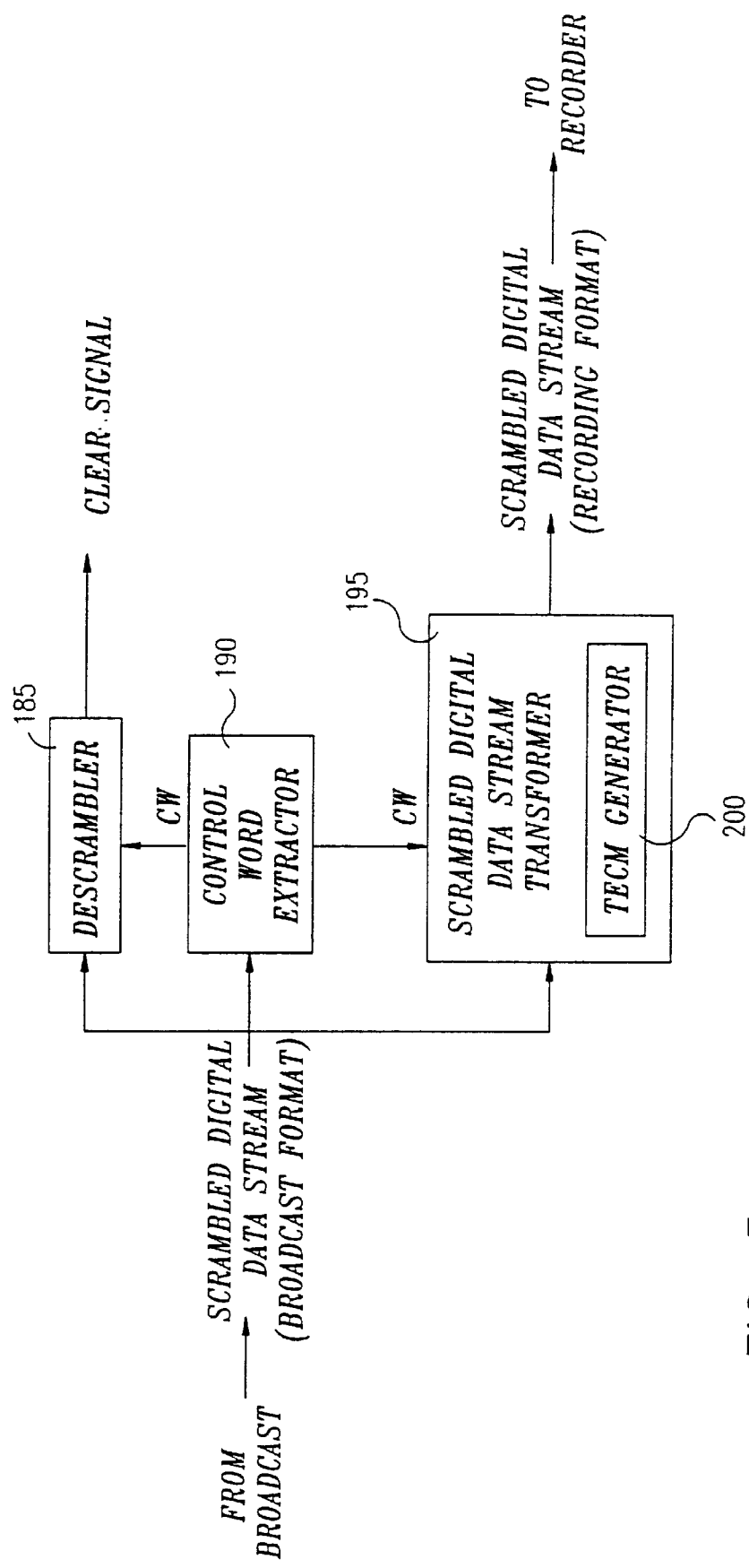
FIG. 3 is a simplified block diagram illustration of a portion of the apparatus of FIG. 1.

Reference is now made to FIG. 3, which is a simplified block diagram illustration of a portion of the IRD 110 of FIG. 1. The portion of the IRD 110 shown in FIG. 3 is shown for providing a better understanding of the construction and operation of the present invention, with standard components well-known in the art, such as components used to receive a broadcast SDDS, not shown in FIG. 3. It is appreciated that the components shown in FIG. 3 may be provided in hardware or in software and, if provided in software, may be provided in combination in software running on one or more general-purpose or special-purpose processors, as is well-known in the art.

The apparatus of FIG. 3 comprises a descrambler 185 and a control word extractor 190. The control word extractor 190 may preferably operate as described above to extract CWs from ECMs in the SDDS, as described above, and to provide the CWs to the descrambler 185. The descrambler 185 meanwhile receives SDSEGs in the SDDS, as described above, and applies each CW received from the descrambler 185 to the associated SDSEG to produce a clear signal.

In addition, the control word extractor 190 preferably supplies the CWs to a scrambled digital data stream transformer 195, the scrambled digital data stream transformer 195 preferably comprising a TECM generator 200. The scrambled data stream transformer 195 also receives the broadcast SDDS and operates, as described above with reference to FIGS. 1 and 2 and below with reference to FIGS. 4 and 5, to produce therefrom a recording SDDS, which is typically provided to a recorder.

It may thus be appreciated that descrambling operations to produce a clear signal, the descrambling, operations being typically similar to descrambling operations well-known in the art, may occur in the apparatus of FIG. 3 in parallel with the production of a recording SDDS. It is appreciated that, in a preferred implementation of the apparatus of FIG. 3, adequate buffering may be provided in the scrambled digital data stream transformer 195 or elsewhere in order to permit continuous production of the recording SDDS from the broadcast SDDS. Such methods of buffering are well-known in the art.

It is further appreciated that the apparatus of FIG. 3 may be operative to descramble a recording SDDS and provide a clear signal therefrom by providing the recording SDDS as input to the apparatus of FIG. 3 in place of the broadcast SDDS, the control word extractor being operative in such a mode to provide control words, as described above, using a TECM key rather than an ECM key.

Figure 4:
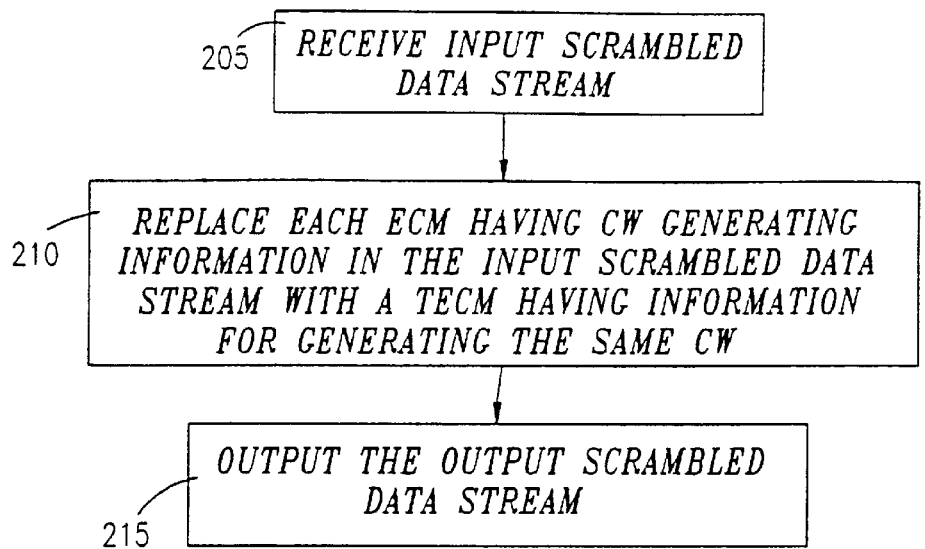
FIG. 4 is a simplified flowchart illustration of a preferred method of operation of the apparatus of FIG. 3.

Reference is now made to FIG. 4 which is a simplified flowchart illustration of a preferred method of operation of the apparatus of FIG. 3. The method of FIG. 4 preferably comprises the following steps:

An input SDDS is received (step 205). Each ECM in the input SDDS is replaced with a TECM, the ECM comprising CW generating information and the TECM also comprising control word generating information for generating the same CW as the ECM (step 210). An output SDDS is thus produced. The output SDDS is then output (step 215)

Figure 5:
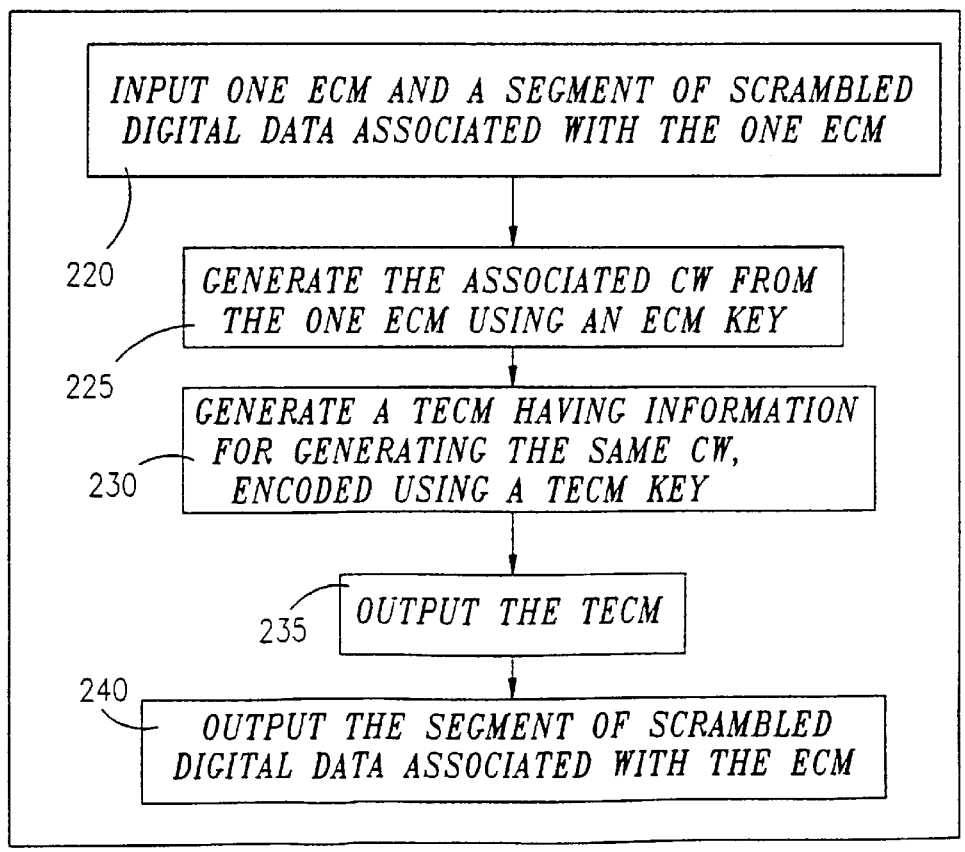
FIG. 5 is a simplified flowchart illustration of a preferred implementation of step 210 of FIG. 4.

Reference is now made to FIG. 5, which is a simplified flowchart illustration of a preferred implementation of step 210 of FIG. 4. The method of FIG. 5 preferably comprises the following steps, which are preferably performed iteratively for each ECM in the input SDDS:

One ECM and an SDSEG associated with the ECM are input (step 220). The CW associated with the ECM is generated from the ECM using an ECM key (step 225). A TECM is generated using a TECM key, the TECM comprising information for generating the same CW as the ECM (step 230). The TECM is output (step 235), and the SDSEG associated with the ECM, and thus also associated with the TECM, is also output (step 240).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination. It is particularly appreciated that the functions described herein as being performed by a removable security device or smart card may be performed by another appropriate part of the system described, such as an IRD.

It will be appreciated by persons skilled in the art that the present invention is not limited by what has been particularly shown and described hereinabove. Rather the scope of the invention is defined only the by claims which follow:

What is claimed is:

1. A method for producing an output scrambled digital data stream from an input scrambled digital data stream, the input scrambled digital data stream comprising a plurality of control messages (ECMs), each ECM comprising coded information for generating a control word (CW) associated with the ECM and being encoded using an ECM key, the input scrambled digital data stream also comprising a plurality of segments of scrambled digital data, each segment of scrambled digital data being associated with one of the plurality of ECMs and being scrambled using the CW associated with the ECM, the method comprising:

replacing each of the plurality of ECMs with a corresponding transformed ECM (TECM), each corresponding TECM comprising coded information for generating the CW associated with the corresponding ECM and being encoded using a TECM key, thus producing the output scrambled digital data stream, wherein the ECM key is replaced with a new ECM key at an ECM key change time, and the TECM key is not replaced at the ECM key change time.

2. A method according to claim 1 and wherein the step of replacing comprises performing the following steps iteratively for each one of the plurality of ECMs:

receiving the one ECM and the segment of scrambled digital data associated therewith;

generating the associated CW from the one ECM using the ECM key;

generating a transformed ECM (TECM) comprising coded information for generating the associated CW and being encoded using a TECM key;

outputting the TECM; and outputting the segment of scrambled digital data associated with the ECM.

3. A method for recording, on a recording medium, a broadcast scrambled digital data stream to produce a scrambled digital recording, the broadcast scrambled digital data stream comprising a plurality of control messages (ECMs), each ECM comprising coded information for generating a control word (CW) associated with the ECM and being encoded using an ECM key, the broadcast scrambled digital data stream also comprising a plurality of segments of scrambled digital data, each segment of scrambled digital data being associated with one of the plurality of ECMs and being scrambled using the CW associated with the ECM, the method comprising:

receiving the broadcast scrambled digital data stream; and recording on the recording medium a scrambled digital data stream comprising a plurality of transformed ECMs (TECMs) and the plurality of segments of digital data, wherein each of the plurality of ECMs is replaced with a corresponding TECM, each corresponding TECM comprising coded information for generating the CW associated with the corresponding ECM and being encoded using a TECM key.

4. A method according to claim 3 and wherein the recording step comprises performmning the following steps iteratively for each one of the plurality of ECMs in the broadcast scrambled digital data stream:

generating the associated CW from the one ECM using the ECM key;

generating a TECM comprising coded information for generating the associated CW and being encoded using a TECM key;

recording the TECM on the recording medium; and recording the segment of scrambled digital data associated with the one ECM on the recording medium.

5. A method according to claim 3 and wherein the recording medium comprises a digital tape.

6. A method according to claim 3 and wherein the recording medium comprises a computer-accessible storage medium associated with a computer.

7. A method according to claim 3 and wherein the broadcast scrambled digital data stream comprises a television scrambled digital data stream.

8. A method according to claim 1 and wherein each of the plurality of ECMs is encoded using a hashing method.

9. A method according to claim 3 and wherein each of the plurality of ECMs is encoded using a hashing method.

10. Apparatus for recording, on a recording medium, a broadcast scrambled digital data stream to produce a recorded scrambled digital data stream, the broadcast scrambled digital data stream comprising a plurality of scrambling control messages (ECMs), each ECM comprising coded information for generating a control word (CW) associated with the ECM and being encoded using an ECM key, and a plurality of segments of scrambled digital data, each segment of scrambled digital data being associated with one of the plurality of ECMs and being scrambled using the CW associated with the ECM, the apparatus comprising:

receiving apparatus for receiving the broadcast scrambled digital data stream; and recording apparatus for recording on the recording medium a scrambled digital data stream comprising a plurality of transformed ECMs (TECMs) and the plurality of segments of digital data, wherein each of the plurality of ECMs is replaced with a corresponding TECM, each corresponding TECM comprising coded information for generating the CW associated with the corresponding ECM and being encoded using a TECM key.

11. Apparatus for producing an output scrambled digital data stream from an input scrambled digital data stream, the input scrambled digital data stream comprising a plurality of scrambling control messages (ECMs), each ECM comprising coded information for generating a control word (CW) associated with the ECM and being encoded using an ECM key, and a plurality of segments of scrambled digital data, each segment of scrambled digital data being associated with one of the plurality of ECMs and being scrambled using the CW associated with the ECM, the apparatus comprising:

ECM replacement apparatus for replacing each of the plurality of ECMs with a corresponding transformed ECM (TECM), each corresponding TECM comprising coded information for generating the CW associated with the corresponding ECM and being encoded using a TECM key, wherein the ECM key is replaced with a new ECM key at an ECM key change time, and the TECM key is not replaced at the ECM key change time.

12. Apparatus according to claim 10 and wherein the recording apparatus comprises:

a CW extractor for generating the associated CW from each of the plurality of ECMs using the ECM key;

a TECM generator for receiving the associated CW from the CW extractor and for generating a TECM comprising coded information for generating the associated CW and being encoded using a TECM key; and medium recording apparatus for receiving the TECM from the TECM generator and the segment of scrambled digital data from the receiving apparatus and for recording the TECM and the segment of scrambled digital data associated with the one of the plurality of ECMs on the recording medium.

13. Apparatus according to claim 11 and wherein the ECM replacement apparatus comprises:

a CW extractor for generating the associated CW from each of the plurality of ECMs using the ECM key; and a TECM generator for receiving the associated CW from the CW extractor and for generating a TECM comprising coded information for generating the associated CW and encoded using a TECM key.

14. Apparatus according to claim 12 and also comprising a removable security device, wherein the removable security device comprises the CW extractor.

15. Apparatus according to claim 14 and wherein the removable security device also comprises the TECM generator.

16. Apparatus according to claim 14 and wherein the removable security device comprises a smart card.

17. Apparatus according to claim 13 and also comprising a removable security device, wherein the removable security device comprises the CW extractor.

18. Apparatus according to claim 17 and wherein the removable security device also comprises the TECM generator.

19. Apparatus according to claim 17 and wherein the removable security device comprises a smart card.

20. Apparatus for transforming a scrambling control message (ECM) comprising coded information for generating a control word (CW) associated with the ECM and being encoded using an ECM key into a transformed scrambling control message (TECM), the apparatus comprising:

ECM input apparatus for receiving the ECM;

a CW extractor for generating the associated CW from the ECM using the ECM key;

a TECM generator for generating a transformed ECM (TECM) comprising coded information for generating the associated CW and being encoded using a TECM key; and ECM output apparatus for outputting the TECM, wherein the ECM key is replaced with a new ECM key at an ECM key change time, and the TECM key is not replaced at the ECM change time.

21. Apparatus for producing an output scrambled digital data stream from an input scrambled digital data stream, the input scrambled digital data stream comprising a plurality of control messages (ECMs), each ECM comprising coded information for generating a control word (CW) associated with the ECM and being encoded using an ECM key, the input scrambled digital data stream also comprising a plurality of segments of scrambled digital data, each segment of scrambled digital data being associated with one of the plurality of ECMs and being scrambled using the CW associated with the ECM, the apparatus comprising:

scrambled digital data stream input apparatus for receiving an ECM and a segment of scrambled digital data associated therewith;

ECM replacement apparatus for replacing the ECM with a transformed ECM (TECM); and scrambled digital data stream output apparatus for outputting the output scrambled digital data stream comprising the TECM and the segment of scrambled digital data, wherein the ECM key is replaced with a new ECM key at an ECM key change time, and the TECM key is not replaced at the ECM key change time.

22. Apparatus according to claim 21 and also comprising:

ECM interface apparatus for outputting the ECM and receiving the TECM.

23. Apparatus according to claim 22 and wherein the ECM interface is adapted to receive a removable security element.

24. Apparatus according to claim 23 and wherein the removable security element comprises a smart card.

25. A method for transforming a scrambling control message (ECM) comprising coded information for generating a control word (CW) associated with the ECM and being encoded using an ECM key into a transformed scrambling control message (TECM), the method comprising:

receiving the ECM;

generating the associated CW from the ECM using the ECM key;

generating a transformed ECM (TECM) comprising coded information for generating the associated CW and being encoded using a TECM key; and outputting the TECM, wherein the ECM key is replaced with a new ECM key at an ECM change time, and the TECM key is not replaced at the ECM change time.

26. A method for producing an output scrambled digital data stream from an input scrambled digital data stream, the input scrambled digital data stream comprising a plurality of control messages (ECMs), each ECM comprising coded information for generating a control word (CW) associated with the ECM and being encoded using an ECM key, the input scrambled digital data stream also comprising a plurality of segments of scrambled digital data, each segment of scrambled digital data being associated with one of the plurality of ECMs and being scrambled using the CW associated with the ECM, the method comprising:

receiving an ECM and a segment of scrambled digital data associated therewith;

replacing the ECM with a transformed ECM (TECM); and outputting the output scrambled digital data stream comprising the TECM and the segment of scrambled digital data, wherein the ECM key is replaced with a new ECM key at an ECM key change time, and the TECM key is not replaced at the ECM key change time.

27. A method according to claim 26 and also comprising: outputting the ECM and receiving the TECM.

28. A method according to claim 27 and wherein the step of outputting the ECM and receiving the TECM comprises:

outputting the ECM to a removable security element and receiving the TECM from the removable security element.

29. A method according to claim 28 and wherein the removable security element comprises a smart card.

* * * * *

UNITED STATES PATENT AND TRADEMARK OFFICE
CERTIFICATE OF CORRECTION

PATENT NO. : 6,178,242 B1
DATED : January 23, 2001
INVENTOR(S) : Yossef Tsuria

It is certified that error appears in the above-identified patent and that said Letters Patent is hereby corrected as shown below:

Column 11,
Line 9, after "time" insert -- , and the TECM is signed with a digital signature --;
Line 44, after "key" insert -- , and each corresponding TECM is signed with a digital signature --.

Column 12,
Line 23, after "key" insert -- and signed with a digital signature --;
Line 43, after "time" insert -- , and each said corresponding TECM is signed with a digital signature --;
Line 63, after "TECM" insert -- signed with a digital signature and --.

Column 13,
Line 27, after "(TECM)" insert -- signed with a digital signature and --;
Line 49, after "(TECM)" insert -- encoded with a TECM key and signed with a digital signature --.

Column 14,
Line 18, after "(TECM)" insert -- signed with a digital signature and --;
Line 38, after "(TECM)" insert -- encoded with a TECM key and signed with a digital signature --;
Line 55, after "card." insert --
30. A method according to claim 1 and wherein the digital signature is associated with the TECM key.
31. A method according to claim 3 and wherein the digital signature is associated with the TECM key.
32. A method according to claim 10 and wherein the digital signature is associated with the TECM key.
33. Apparatus according to claim 11 and wherein the digital signature is associated with the TECM key.
34. Apparatus according to claim 20 and wherein the digital signature is associated with the TECM key.
35. Apparatus according to claim 21 and wherein the digital signature is associated with the TECM key.

UNITED STATES PATENT AND TRADEMARK OFFICE
CERTIFICATE OF CORRECTION

PATENT NO.   : 6,178,242 B1
DATED        : January 23, 2001
INVENTOR(S)  : Yossef Tsuria It is certified that error appears in the above-identified patent and that said Letters Patent is hereby corrected as shown below:

36. Apparatus according to claim 25 and wherein the digital signature is associated with the TECM key.

37. Apparatus according to claim 26 and wherein the digital signature is associated with the TECM key.

38. A method for producing an output scrambled digital data stream from an input scrambled digital data stream, the input scrambled digital data stream comprising a plurality of control messages (ECMs), each ECM comprising coded information for generating a control word (CW) associated with the ECM and being encoded using an ECM key, the input scrambled digital data stream also comprising a plurality of segments of scrambled digital data, each segment of scrambled digital data being associated with one of the plurality of ECMs and being scrambled using the CW associated with the ECM, the method comprising:
    receiving a user identification;
    choosing a transformed ECM (TECM) key from a plurality of available TECM, keys based, at least in part, on the user identification; and
    replacing each of the plurality of ECMs with a corresponding TECM, each corresponding TECM comprising coded information for generating the CW associated with the corresponding ECM and being encoded using the TECM key, thus producing the output scrambled digital data stream,
    wherein the ECM key is replaced with a new ECM key at an ECM key change time, and the TECM key is not replaced at the ECM key change time. --

Signed and Sealed this

Ninth Day of October, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.   : 6,178,242 B1
DATED        : January 23, 2001
INVENTOR(S)  : Yossef Tsuria It is certified that error appears in the above-identified patent and that said Letters Patent is hereby corrected as shown below:

This certificate supersedes Certificate of Correction issued September 4, 2001, the number was erroneusly mentioned and should be deleted since no Certificate of Correction was issued.

Signed and Sealed this

Twenty-third Day of April, 2002

*Attest:*

JAMES E. ROGAN
*Director of the United States Patent and Trademark Office*

*Attesting Officer*